March 14, 1950  R. P. LATHROP  2,500,836
EXTENSOMETER
Filed May 3, 1945　　2 Sheets-Sheet 1
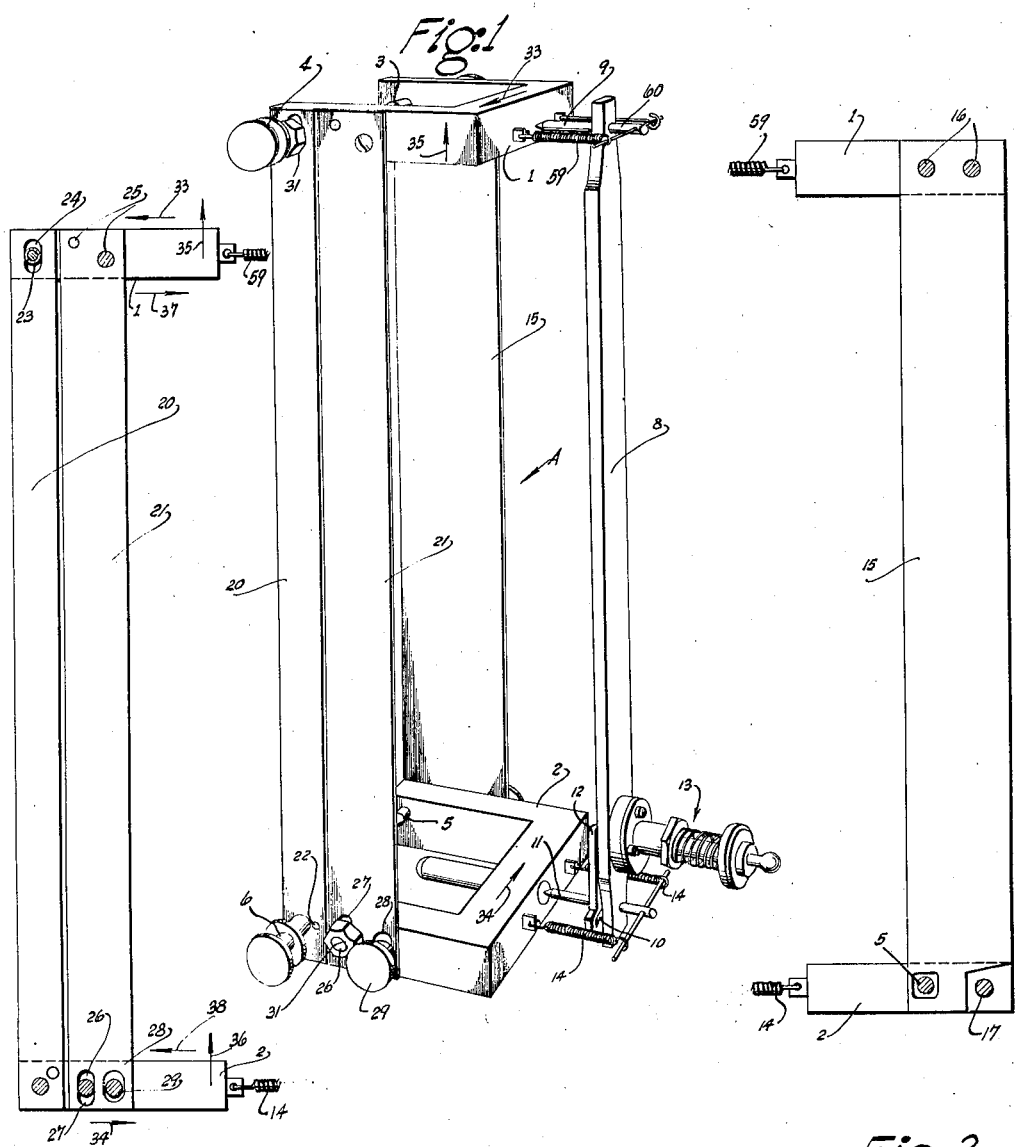
INVENTOR
Robert P. Lathrop
BY
ATTORNEY Patented Mar. 14, 1950

2,500,836

UNITED STATES PATENT OFFICE 2,500,836

EXTENSOMETER

Robert P. Lathrop, Bethesda, Md., assignor to The Baldwin Locomotive Works, a corporation of Pennsylvania Application May 3, 1945, Serial No. 591,789

6 Claims. (Cl. 33—143)

This invention relates generally to extensometers for materials testing and more particularly to averaging type extensometers having upper and lower sets of gage points each set of which constitutes a pair of opposed points engageable with a specimen on opposite sides thereof, it being understood that herein the term "extensometer" includes compressometers.

In the particular form of averaging extensometer disclosed herein the upper and lower sets of gage points are mounted in axially spaced gage blocks which operate a multiplying lever system for measuring axial movement between the two heads in accordance with tension or compression specimen strains. This general type of extensometer and multiplying lever system is disclosed in O. S. Peters Patent 2,198,041. Occasionally a specimen may have certain special physical characteristics, or the operating conditions for loading a specimen may be of such a nature, that the specimen twists slightly about its lengthwise axis when loaded thereby producing relative rotation, in planes normal to the specimen axis, between the upper and lower extensometer heads. This rotation may be in either of opposite directions and in usual extensometers of the averaging type, such opposite rotation will not have a uniform effect upon the measuring system.

It is an object of my invention to provide improved means whereby torsion in either direction in a specimen under test will have a uniform action on the measuring system of an averaging type extensometer so as to produce consistently accurate measurements of strain.

A further object is to provide an improved averaging type extensometer that is relatively simple in construction, operation and maintenance, is rugged for a precision instrument of such type and is compact combined with ease of application to a specimen while at the same time providing a high degree of accuracy, sensitivity and uniformity of action regardless of whether the specimen has torsional effects in either direction.

Other objects and advantages will be more apparent to those skilled in the art from the following description of the accompanying drawings in which:

Fig. 1 is a perspective of one form of my improved extensometer;

Fig. 2 is a side elevation of the foreside of the extensometer shown in Fig. 1 but with certain parts omitted for sake of clarity;

Fig. 3 is a side elevation looking at the back side of Fig. 1 in the direction of arrow A thereof.

Figure 4:
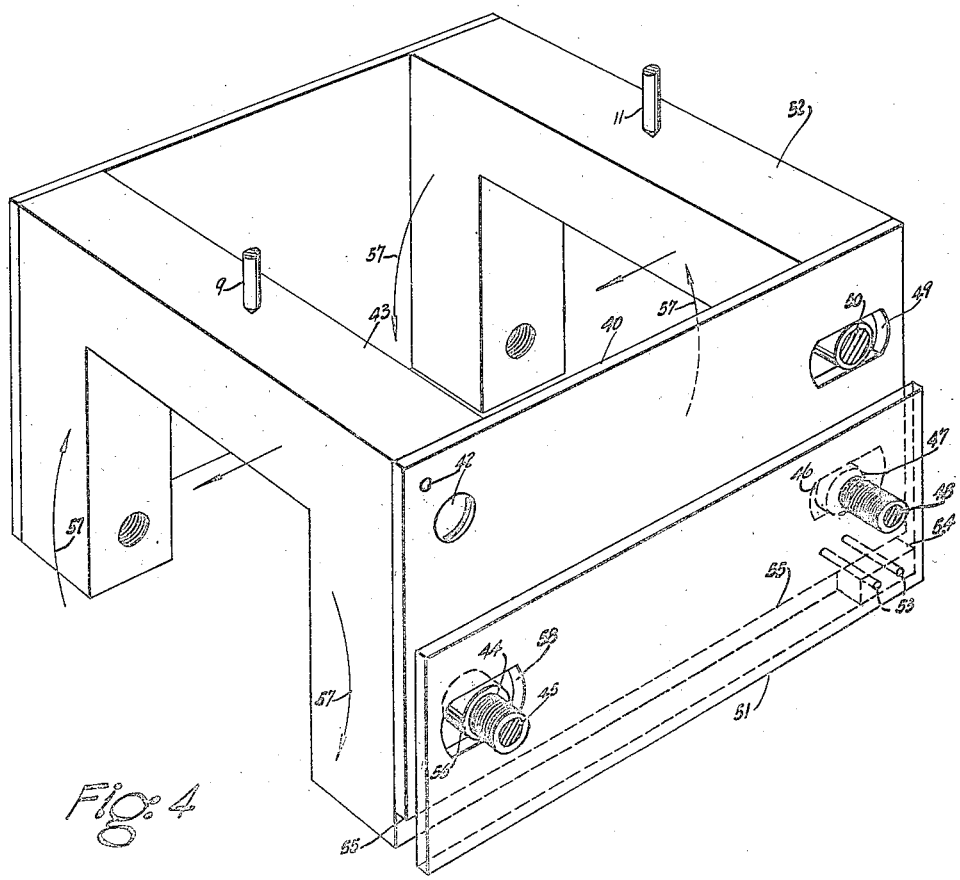
Fig. 4 is a perspective, with certain parts omitted for sake of clarity, showing a modified form of my improved extensometer which, for purposes of illustration, is shown laid on one side.

In the particular embodiments of the invention disclosed herein for purposes of illustration, I have shown in Fig. 1 an extensometer having upper and lower gage blocks 1 and 2 provided with usual opposed gage points 3, 4, 5 and 6 adjustable for different size specimens as disclosed in said Peters patent. Relative axial movement between the gage blocks 1 and 2 in response to compression or tension strains in a specimen (not shown) is preferably measured by a multiplying lever system consisting of a supporting element 8 whose upper end is pivotally connected to block 1 by a fulcrum pin 9 while its lower end engages a knife edge 10 formed as an integral part of a bell crank, one arm 11 of which is a pin having pivotal engagement with block 2 in the same manner as pin 9 and the other arm 12 of which constitutes an electrical contact of a follow-up mechanism generally indicated at 13. Springs 14 hold the pin 11 in contact with block 2 as explained in said Peters patent, while springs 59 in conjunction with an arm 60 lend rigidity to the support of element 8 but permit pin 9 to pivot on block 1 as necessary about its axis and in the vertical plane. To determine the initial gage length of the specimen, i. e., the axial distance between the gage blocks 1 and 2, a normally inactive spacer plate 15 is suitably rigidly secured by a pair of pins or screws 16, Fig. 3, to one side of block 1 while the lower end of said plate has a cut-out corner to provide clearance for a gage length set screw 5 and gage screw 17. The side plate 15 is of such length that when lower edge of block 2 is moved upwardly until it coincides with the lower edge of side plate 15, then the axial distance between the upper and lower gage points on the side of the inactive plate 15 is equal to the desired gage length.

The screw 17 is normally released but may be momentarily fastened, if desired, to hold the heads in their predetermined axially spaced relation until after the extensometer is properly connected to a specimen whereupon the screw 17 may be released to allow free axial movement between the gage blocks. Upon release of screw 17 side plate 15 ceases to control the position or motion of blocks 1 and 2.

Located on the opposite side of the gage blocks is my improved torsion compensating means which includes a pair of active plates 20 and 21. The plate 20 is rigidly secured at its lower end to block 2 as by pins and screws 22 while the upper end has a slidable connection with block 1 through a pin 23 and slot 24 formed in the plate. The plate 21 is rigidly secured by pins and screws 25 to the upper block 1 while its other end is slidably connected to block 2 by pin 26 and slot 27. Plate 21 is of such length that if its lower edge be set flush with lower edge of block 2, where it may be locked in place by the releasable screw 29, then the axial distance between the upper and lower gage points on the side of the active plates 20 and 21 is equal to the desired gage length and both sides of the gage blocks are equally spaced from each other in setting the extensometer for its initial gage length. However, in order that the solid pin 26 and the internally threaded gage screw bushing 23 may have a free sliding relation to their plates at all times they may have externally threaded reduced ends to provide shoulders whereby nuts 31, 31 can be firmly tightened without pinching the plates against their respective gage blocks.

In operation, it will be assumed that the extensometer is mounted on a specimen by proper diametrical adjustment of the gage points 3–6 and that the dummy plate 15 is fully released at lock screw 17 and that lock screw 29 is similarly released. If torsion now occurs in the specimen so that heads 1 and 2 rotate relative to each other in the direction of, say, arrows 33 and 34 respectively, Fig. 1, then head 1 will rotate upwardly about gage points 3 and 4 in the direction of arrow 35 by reason of pin 26, Fig. 2, of lower block 2 rotating in the direction of arrow 34, and therefore, moving the lower end of plate 21 to the right to produce rotation in a counterclockwise direction about upper gage points 3 and 4 of upper block 1, such movement being transmitted to the block through the fixed pin connection 25. Similarly, the foregoing relative rotation causes block 1 to move in the direction of arrow 33 whereby pin 23 moves plate 20 to the left thereby producing rotation in a counterclockwise direction of the lower block 2 about the gage points 5 and 6. This results in moving the lower block 2 upwardly in the direction of arrow 36 so that the two blocks are maintained in substantial parallelism to each other. In the event that the torsion is in a direction opposite to arrows 33 and 34, the compensating action of plates 20 and 21 will be in a clockwise direction to swing blocks 1 and 2 downwardly together instead of upwardly as previously described. For instance, as block 1 rotates in the direction of arrow 37 the pin 23 would swing plate 20 in a clockwise direction about the lower gage point 5 whereupon the rigid connection between this plate and lower block 2 would cause the latter to swing downwardly about the gage point. Similarly, such relative rotation causes lower gage block 2 to move in the direction of arrow 38 to move the lower end of plate 21 to the left and produce a clockwise rotation about the upper gage point 4 with consequent rotation of block 1 in a downward direction about such gage point. The two blocks are thus again maintained in substantial parallelism. It will be understood that it is desired to maintain a constant distance between the seats for pins 9 and 11 except for specimen strain in an axial direction. However, specimen torsion, if it occurs during testing, will relatively rotate the blocks 2 and 3 in horizontal planes, i. e., laterally displace the blocks relative to each other. This lateral displacement causes the distance between the pin seats to be increased a very slight amount and thereby move the electric contact levers in addition to movement caused by axial strain of the specimen. The foregoing lateral displacement produces only a negligible error within the degree of accuracy I desire. A greater source of error that has heretofore existed is that the side plate and its connections heretofore used acted to cause blocks 2 and 3 to be tilted toward or away from each other upon occurrence of such lateral movement. This tilting action caused the measuring pin seats to be moved relatively toward or away from each other in addition to the movement caused directly by the lateral displacement. This additional movement is almost entirely eliminated in my arrangement which maintains the blocks in substantial parallelism when they tend to tilt in response to torsion. The blocks are made to tilt in the same direction and through equal angles but because there will be relative rotation between the blocks the axes of the upper and lower sets of gage points will be relatively angularly displaced and the tilting action will be about these axes. Accordingly, the blocks cannot tilt in absolute parallelism to each other but this deviation from parallelism is negligible in its effect.

From the foregoing mode of operation it is seen that the upper and lower gage blocks are always maintained in substantial parallelism to each other regardless of the direction of relative rotation between the upper and lower heads produced by opposite torsional effects in a specimen. It is, therefore, possible to maintain with a high degree of precision a substantially constant distance between the fulcrum points of pins 9 and 11 during torsion of the specimen and hence such torsional effects will not have any appreciable effect upon the strain measuring leverage system 8 and 12. This measuring system is, therefore, left free to respond only to actual changes in strain, disregarding the negligible effect of lateral displacement, between the seats for measuring pins 9 and 11, upon occurrence of torsion.

*Fig. 4 modification.*—In this arrangement the pair of active or compensating plates are shown at 40 and 51 in overlapping relation to each other in distinction to the side by side relation of plates 20 and 21 in Fig. 1. The plate 40 is rigidly secured at its left end by pins and screws 42 to gage block 43 and is also fitted snugly over a hollow gage screw bushing 44 within which a gage screw 45 is threaded. The opposite end of plate 40 has a slot 46 which has a lapped fit on a gage screw bushing 47 within which a gage screw 48 is threaded. A second slot 49 formed in plate 40 has clearance for lock screw 50. The ends of screws 45, 48 and 50 are shown in section for clarity.

The second plate 51 is secured to the second gage block 52 by dowel pins 53 and a spacer 54 which is disposed just below the shortened edge 55 of plate 40. A nut on threaded bushing 48 may firmly rigidly hold side plate 51 against the shoulder of bushing 47 thereby to cause plate 51 to be rigidly secured to gage block 52. Pins 53 and the nut and screw bushing 48 also assist in holding the side plate 51. The other end of plate 51 is provided with a slot 56 having a lapped fit on the gage screw bushing 44. The shouldered body portion of bushings 44 and 47 are of such length as to provide any desirable clearance between the side plates thereby permitting nuts to be threaded on these bushings and firmly tightened against the shoulder 56 and also against the face of plate 41 as previously described.

The strain measuring levers are omitted from Fig. 4 as are also the adjustable gage point screws except 45 and 48 (shown in section). Such parts and others would, however, be identical to those of Fig. 1 but need not be repeated as the principal feature of Fig. 4 is the overlapping of the active plates.

The operation of Fig. 4 modification is the same as Fig. 1 in that any rotation of gage block 43 in in a plane normal to the specimen axis in the direction of arrow 57 will produce a resulting rotation of plate 51 about the axis of gage point bushing 48 thereby tipping gage block 52 to the left. Similarly, the foregoing relative rotation 57 in the opposite direction of gage block 52 will produce a resulting rotation on plate 40 in a counterclockwise direction about the axis of gage point bushing 44 thereby tipping gage block 43 to the left and thus maintain the two gage blocks in substantial parallelism. Torsional movement of the specimen in the opposite direction will cause each plate to move in a clockwise direction and accordingly tend to tip the gage blocks to the right to maintain them in substantial parallelism. The length of side plates 40 and 51 may be such as to determine the initial setting of the gage length merely by setting the ends of the side plates flush with the outside edges of the two gage blocks in the manner described for Fig. 1.

From the foregoing disclosure of the two modifications, it is seen that I have provided an extensometer that is able to compensate for torsional effects in a specimen for either direction of torsion thereby producing an instrument with a high degree of precision with no sacrifice of its sensitivity or accuracy while at the same time providing ruggedness, compactness and ease of application to the specimen.

It will of course be understood that various changes in details of construction and arrangement of parts may be made by those skilled in the art without departing from the spirit of the invention as set forth in the appended claims.

I claim:

1. An averaging extensometer comprising, in combination, upper and lower gage blocks each having opposed gage points, strain measuring means having points of connection to said blocks, means responsive to relative rotation between said blocks about the axis of a specimen arising from torsional effects in the specimen to which the extensometer is connected for rotating one of said blocks in a given direction about the gage points of said block, and means for similarly rotating the other of said blocks in the same direction in response to said torsional effects, both of said means for rotating said blocks being disposed on the same side thereof thereby maintaining the distance between said points of connection of the measuring means substantially independent of such torsion.

2. An averaging extensometer comprising, in combination, upper and lower gage blocks each having opposed gage points, strain measuring means connected to said blocks, and torsional compensating means comprising a plurality of lever arms one of which is rigidly connected at one end to the lower gage block and slidably connected to the upper gage block and the other of which is rigidly connected to the upper gage block and slidably connected to the lower gage block, both of said lever arms being disposed on the same side of said blocks whereby relative rotation between said blocks arising from specimen torsion will cause said lever arms to tilt the gage blocks in the same direction and maintain the same substantially parallel to each other substantially independent of specimen torsion.

3. The combination set forth in claim 2 further characterized in that said lever arms are side plates both disposed on one side of said gage blocks.

4. The combination set forth in claim 2 further characterized in that said lever arms are side plates disposed on the same side of the gage blocks in edgewise relation to each other.

5. The combination set forth in claim 2 further characterized in that said lever arms are plates disposed in overlapping relation to each other on the same side of the gage blocks.

6. An extensometer comprising, in combination, upper and lower gage blocks each having gage points, strain measuring means having overlapping levers the first of which is pivotally connected to the upper block and another of which is pivotally connected to the lower block and a pivotal connection between said levers adjacent to the lower block, yieldable means for maintaining the pivotal connection between said levers and with said lower block, and means for maintaining the pivotal connection between the first lever and the upper block including a cross arm connected to said first lever adjacent the upper block and yieldable means connecting said cross arm to the upper block.

ROBERT P. LATHROP.

REFERENCES CITED

The following references are of record in the file of this patent:

UNITED STATES PATENTS

| Number | Name | Date |
| --- | --- | --- |
| 2,017,876 | Tripolitis | Oct. 22, 1935 |
| 2,198,041 | Peters | Apr. 23, 1940 |
| 2,301,872 | Henderson | Nov. 10, 1942 |